United States Patent
Tokutake

(10) Patent No.: US 9,430,067 B2
(45) Date of Patent: Aug. 30, 2016

(54) DEVICE AND METHOD FOR TOUCH DETECTION ON A DISPLAY PANEL

(71) Applicant: Sony Mobile Communications Inc., Minato-ku (JP)

(72) Inventor: Kenji Tokutake, Kanagawa (JP)

(73) Assignees: Sony Corporation, Tokyo (JP); Sony Mobile Communications Inc., Minato-ku (JP)

( * ) Notice: Subject to any disclaimer, the term of this patent is extended or adjusted under 35 U.S.C. 154(b) by 328 days.

(21) Appl. No.: 13/739,497

(22) Filed: Jan. 11, 2013

(65) Prior Publication Data

US 2014/0198052 A1    Jul. 17, 2014

(51) Int. Cl.
*G06F 3/041* (2006.01)

(52) U.S. Cl.
CPC ............ *G06F 3/041* (2013.01); *G06F 3/0412* (2013.01); *G06F 3/0416* (2013.01)

(58) Field of Classification Search
CPC .... G06F 3/041; G06F 3/0412; G06F 3/0416; G06F 3/048; G06F 3/0481; G06F 3/0484; G06F 3/04845
USPC ........................................................ 345/173
See application file for complete search history.

(56) References Cited

U.S. PATENT DOCUMENTS

| | | | |
|---|---|---|---|
| 5,880,717 A * | 3/1999 | Chan et al. ................... 345/173 |
| 8,411,060 B1 * | 4/2013 | Scholler et al. .............. 345/173 |
| 8,487,896 B1 * | 7/2013 | Brown et al. ................. 345/173 |
| 8,621,395 B2 * | 12/2013 | Bau ..................... G06F 3/04812 715/856 |
| 9,019,230 B2 * | 4/2015 | Li ........................... G06F 3/044 178/18.06 |
| 9,218,094 B1 * | 12/2015 | Slezinskyy |
| 2007/0018966 A1 * | 1/2007 | Blythe et al. ................. 345/173 |
| 2010/0289826 A1 * | 11/2010 | Park et al. .................... 345/676 |
| 2012/0105357 A1 * | 5/2012 | Li et al. ....................... 345/174 |
| 2013/0181908 A1 * | 7/2013 | Santiago et al. ............. 345/173 |
| 2014/0152590 A1 * | 6/2014 | Brown et al. ................. 345/173 |

* cited by examiner

*Primary Examiner* — Jason Mandeville
(74) *Attorney, Agent, or Firm* — Oblon, McClelland, Maier & Neustadt, L.L.P.

(57) ABSTRACT

Discussed herein is an information processing apparatus that detects a touch input at a touch panel disposed on or formed integrally with a display panel, performs sampling of the detected touch position and utilizes a predictive filter to estimate the coordinates of the touch position. The apparatus comprises a controller that actuates the predictive filter based on the application being executed and updates the display panel with the estimated coordinates when a predetermined condition is satisfied.

13 Claims, 17 Drawing Sheets

*FIG. 10*
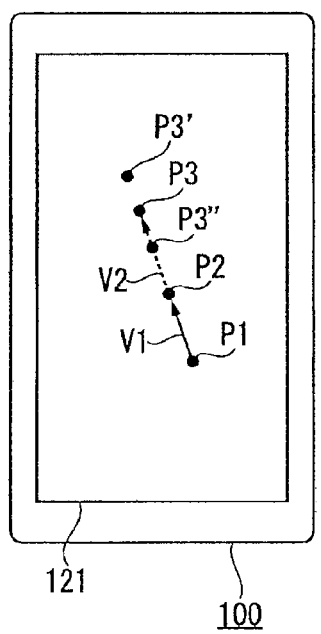
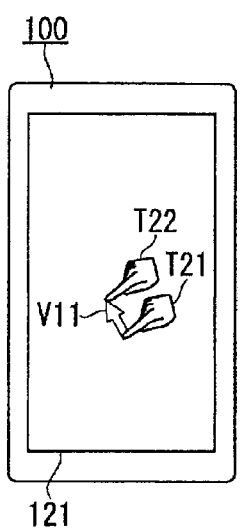
*FIG. 11A*
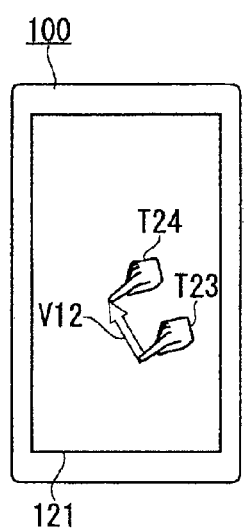
*FIG. 11B*
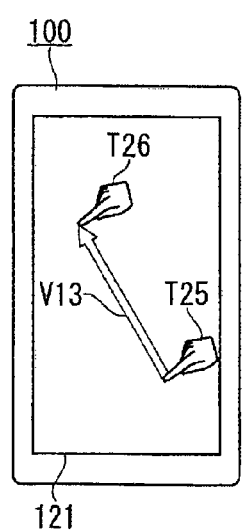
*FIG. 11C*

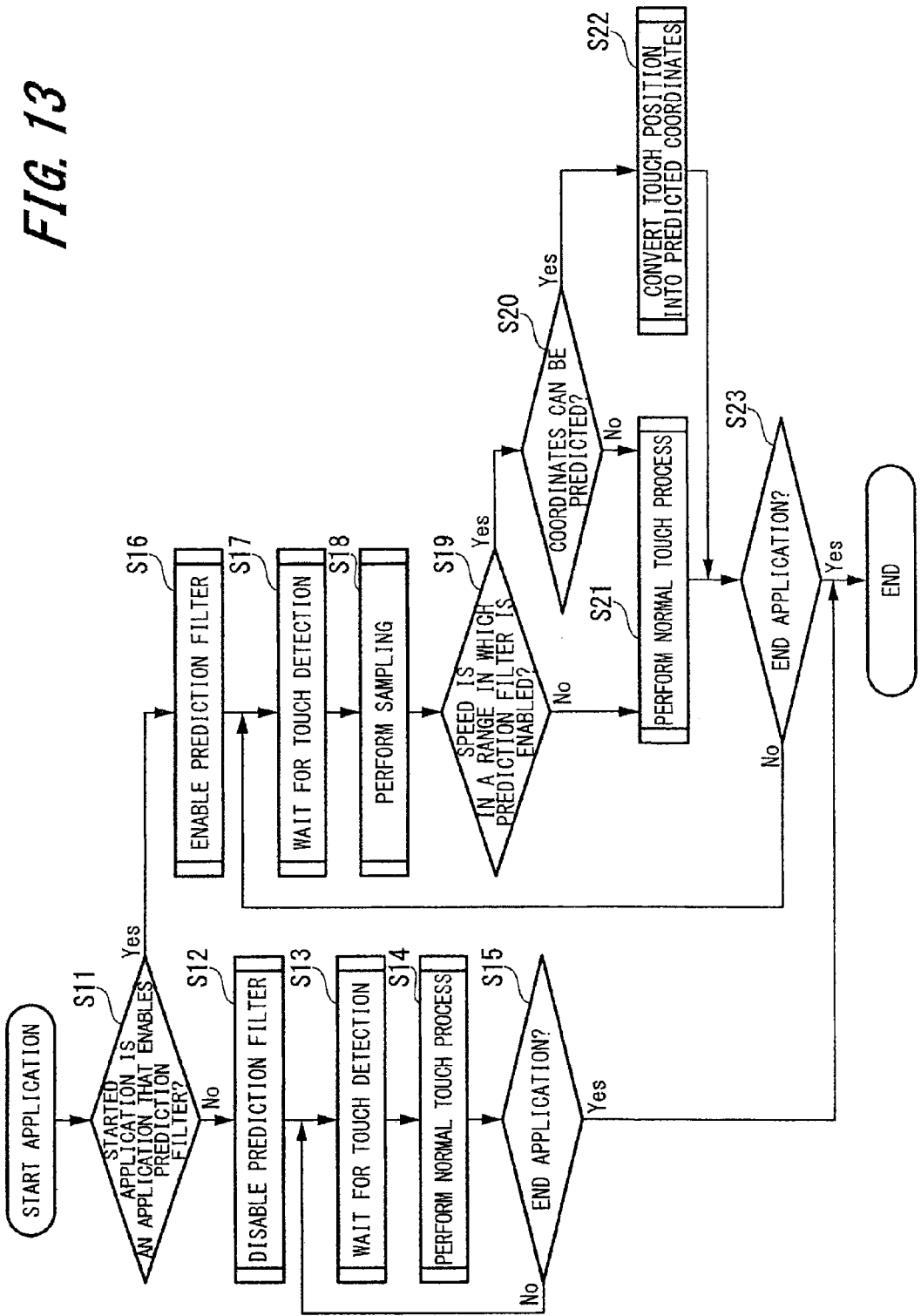

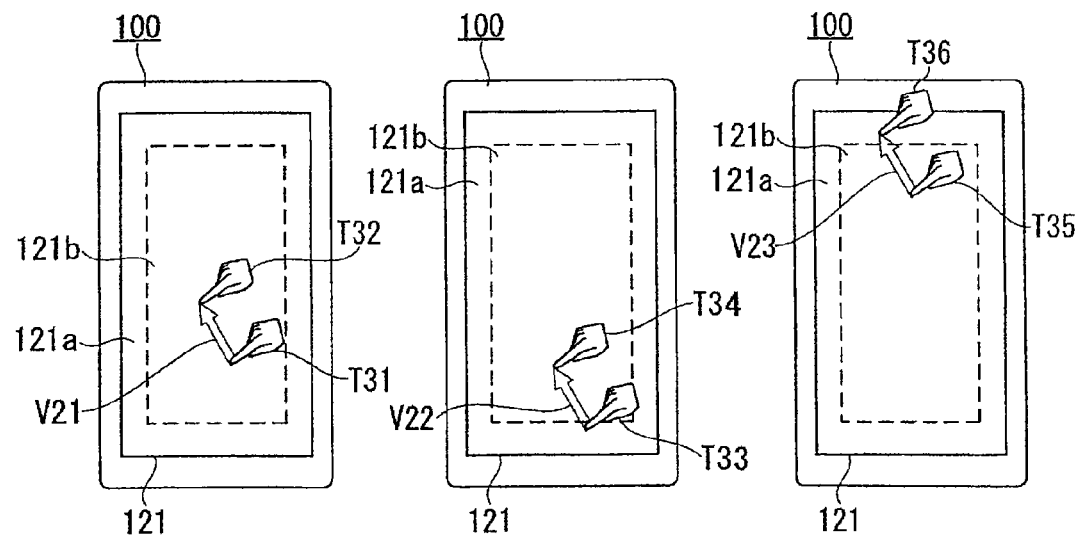
FIG. 14A   FIG. 14B   FIG. 14C
FIG. 15
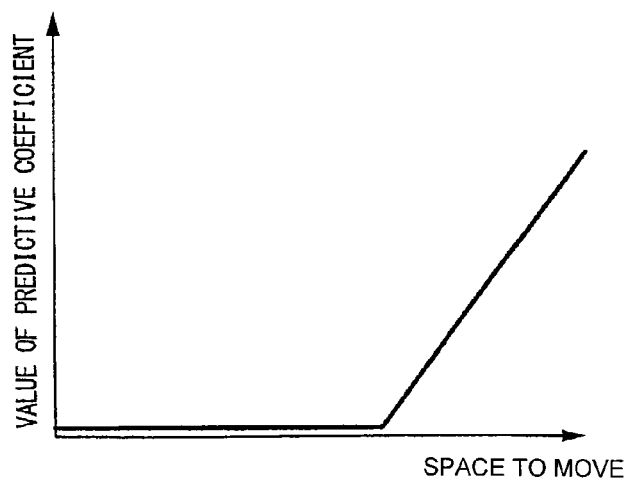

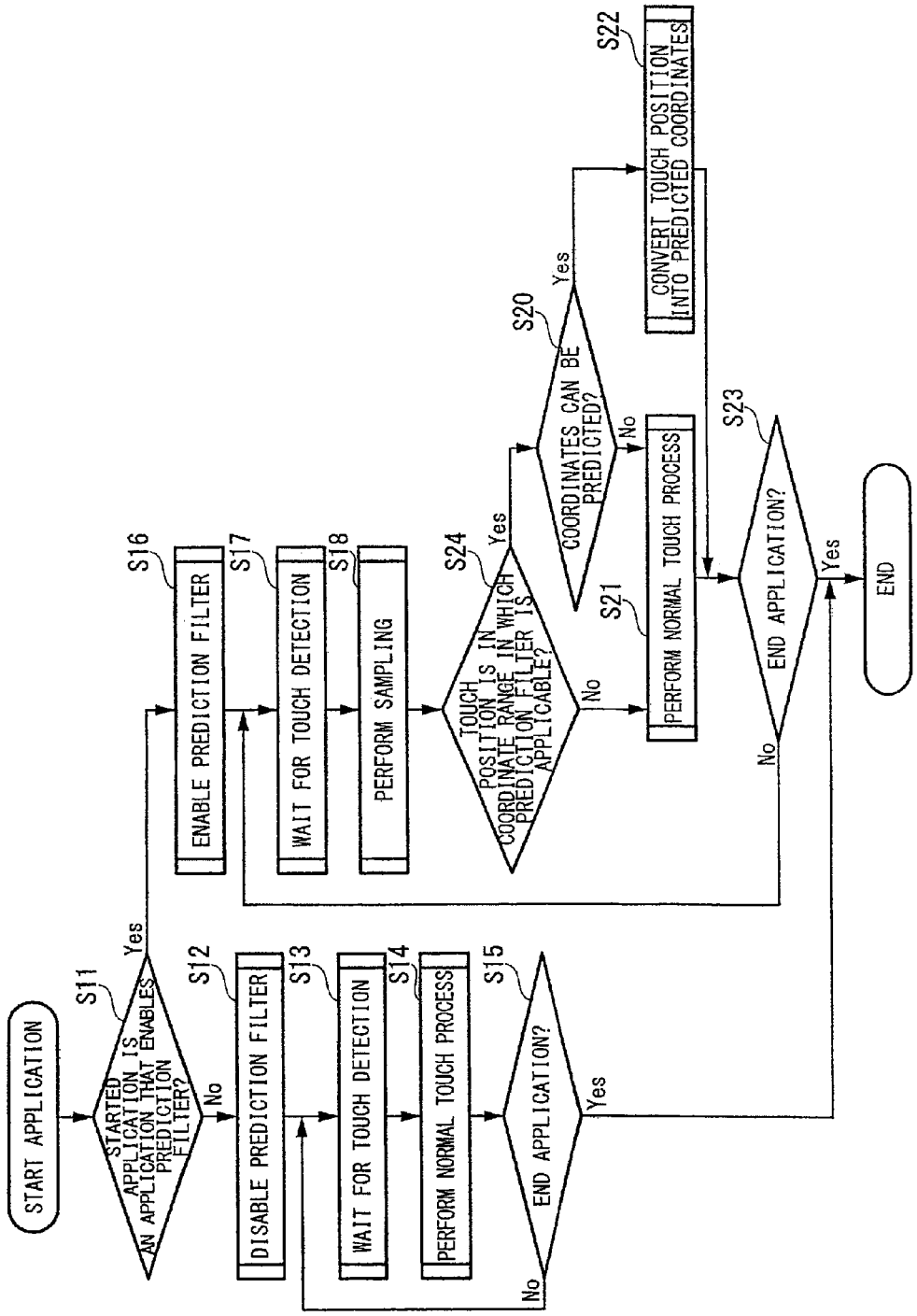

DEVICE AND METHOD FOR TOUCH DETECTION ON A DISPLAY PANEL

BACKGROUND

1. Field of the Disclosure

This disclosure relates to accurately predicting the coordinates of a touch operation on a display panel by using a predictive unit, such as a predictive filter or the like.

2. Description of the Related Art

Mobile devices, such as smart phones, tablets or the like are available for displaying data on a screen. The displayed data may comprise pictures, text, videos, or web pages. The mobile devices may include a touch screen, which may be configured to accept a user's input in the form of a touch operation. The touch operation may correspond to the user contacting the surface of the touch screen with an instruction object, such as a finger or stylus.

Frequent usage of such devices include the commonly known drag, slide and flick features. Specifically, a user indicates the movement of an icon displayed on the screen by a touch operation (thereby highlighting the icon), followed by a drag operation wherein the user indicates the position where the icon should be placed. Another commonly encountered scenario is the scroll operation. While viewing a webpage or an image, a user slides his fingers on the display panel thereby indicating the direction in which he intends to move the web page/image for further viewing. In such scenarios, it is preferable that the webpage/image slides in quick response to the movement of the finger or stylus. Specifically, it is expected that the data (corresponding to the touch location) moves simultaneously along with the movement of the finger and there is no time lag between the movement of the finger/stylus and the corresponding motion of the respective data.

However, we notice that while viewing a webpage there frequently arises a problem wherein there is an overshoot between the movement on the finger on the screen and the webpage scrolling in response to such a movement. Often times even after the scrolling operation of the finger has stopped, the web page continues to scroll or when a user actuates such an operation there is a time lag (delay) between the time of actuation and the actual response. Such occurrences prove to cause inconvenience to the user.

Such problems frequently occur due to incorrect detection of a touch operation. Specifically, the cursor on the display panel intended to indicate the location of a touch, may not coincide exactly with the actual touch position. Accordingly, there is a requirement to accurately detect a touch position and further minimize the time-lag (delay) between the instant of time when data on a display screen slides and the time when a slide operation was triggered in order to provide the user a satisfying experience.

SUMMARY

Devices and methods for correctly and easily detecting a touch operation on a touch panel are discussed herein.

According to one exemplary embodiment, the disclosure is directed to an information processing apparatus that comprises: a display configured to indicate a display position corresponding to a touch input; a touch sensor formed integrally with the display and configured to detect the touch input; and a circuitry configured to receive coordinate positions corresponding to the touch input from the touch sensor; sample the coordinate positions corresponding to the touch input; calculate a motion vector corresponding to the touch input based on the sampling of the coordinate positions of the touch input; compute a coefficient estimation parameter for the motion vector based on a predetermined condition; and control the display to indicate a display position corresponding to a predicted future touch input based on the coefficient estimation parameter.

According to another exemplary embodiment, the disclosure is directed to a method performed by an information processing apparatus, the method comprising: displaying a display position corresponding to a touch input; detecting a touch input by a touch sensor; receiving coordinate positions corresponding to the touch input; sampling the coordinate positions corresponding to the touch input; calculating a motion vector corresponding to the touch input based on the sampling; computing by a circuitry a coefficient estimation parameter for the motion vector based on a predetermined condition; and controlling the display to indicate a display position corresponding to a predicted future touch input based on the computing.

According to another exemplary embodiment, the disclosure is directed to a non-transitory computer-readable medium including computer program instructions, which when executed by an information processing apparatus, cause the information processing apparatus to perform a process, the process comprising displaying a display position corresponding to a touch input; detecting a touch input by a touch sensor; receiving coordinate positions corresponding to the touch input; sampling the coordinate positions corresponding to the touch input; calculating a motion vector corresponding to the touch input based on the sampling; computing by a circuitry a coefficient estimation parameter for the motion vector based on a predetermined condition; and controlling the display to indicate a display position corresponding to a predicted future touch input based on the computing.

The foregoing general description of the illustrative implementations and the following detailed description thereof are merely exemplary aspects of the teachings of this disclosure, and are not restrictive.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 10 illustrates a non limiting example depicting the method used by the predictive unit in determining the coordinates of a touch operation;

FIGS. 11A-11C illustrates the criteria for enabling the predictive unit according to one aspect of the present disclosure;

FIG. 13 is a flowchart according to one aspect of the present disclosure, outlining the steps performed by the control unit while employing a predictive unit;

FIGS. 14A-14C illustrate the criteria for enabling the predictive unit according to another aspect of the present disclosure;

FIG. 15 depicts a graph that illustrates the behavior of the prediction coefficient parameter according to another aspect of the present disclosure;

FIG. 17 is a flowchart according to a second aspect of the present disclosure, outlining the steps performed by the control unit while employing a predictive unit;

DETAILED DESCRIPTION

Figure 1:
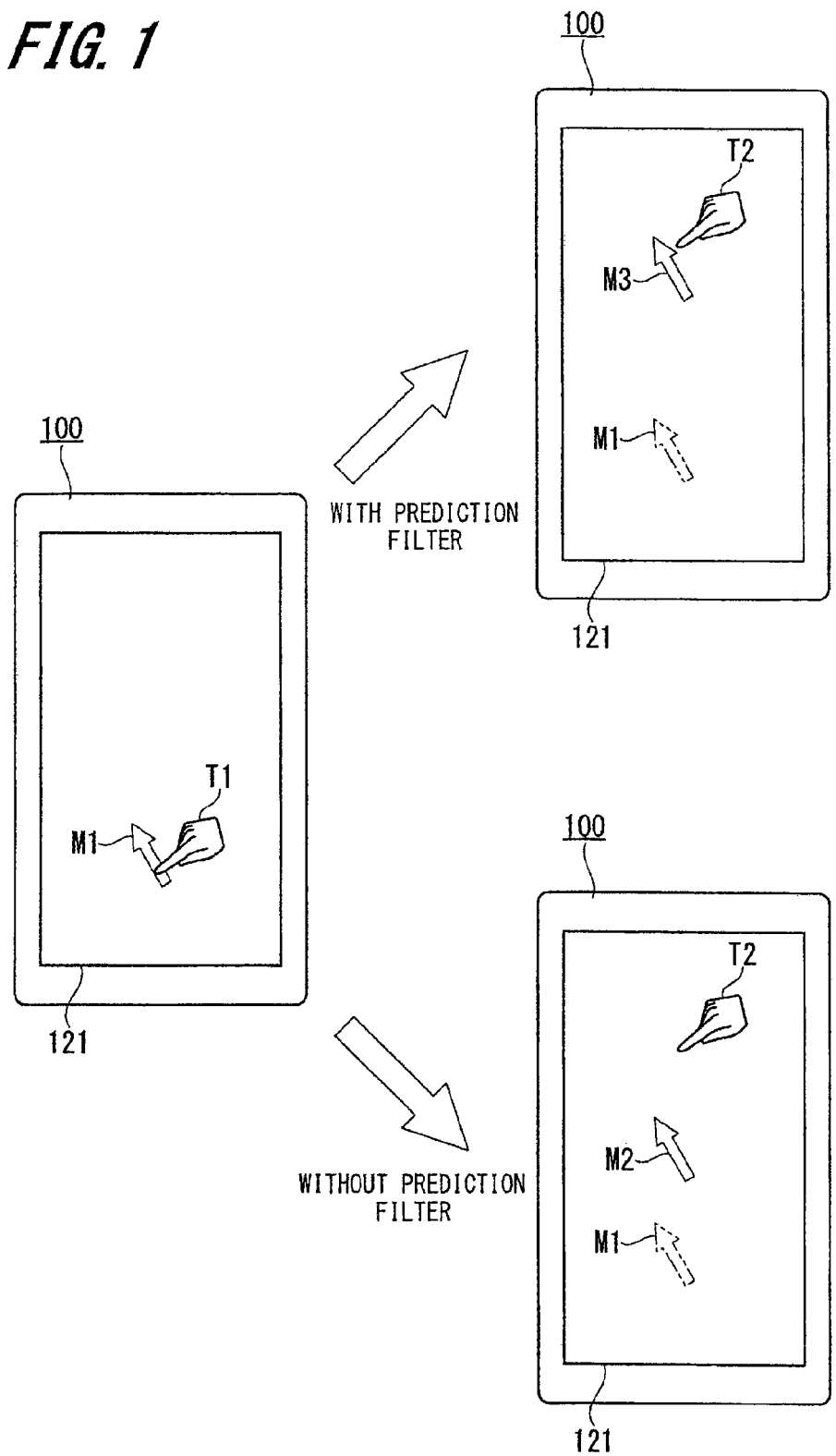
FIG. 1 illustrates schematically an exemplary scenario outlining the advantages of employing a prediction unit.

Referring now to the drawings, wherein like reference numerals designate identical or corresponding parts throughout the several views.

FIG. 1 illustrates a non-limiting exemplary scenario outlining the advantages incurred by using a prediction unit for predicting the change of a touch position. A mobile device 100 is equipped with a display panel 121. M1, represents a display position of an initial touch position represented by T1.

Consider a scenario wherein in a short amount of time the touch position is changed from T1 to T2. In the event of not using the prediction unit, a change of touch position (from T1 to T2) results in the display position being represented by M2, which is further away from the touch position T2. Thus when the prediction unit is in an OFF state, the change of the display position is delayed significantly as compared to the change of the touch position.

Contrary to the above scenario, consider the case wherein the prediction unit is in the ON state. In this case, a prediction mechanism (to be discussed) predicts the change of position from T1 to T2. The display position M1 of the object superimposed on the touch position T1 is represented by a display position M3, which is located near the touch position T2. Thus employing a prediction unit in device 100 provides a more accurate display position corresponding to a change of a touch operation on the display panel of device 100.

The present invention outlines the conditions which determine whether the prediction unit of device 100 should be turned ON or OFF, based on factors such as the changing state of the touch position, the application used, and the like. Further, it must be appreciated that the prediction unit as depicted in FIG. 1 corresponds to a change in the touch operation. A similar advantage is obtained for the case wherein the display panel displays an entire image, and the user initiates a slide operation.

Figure 2:
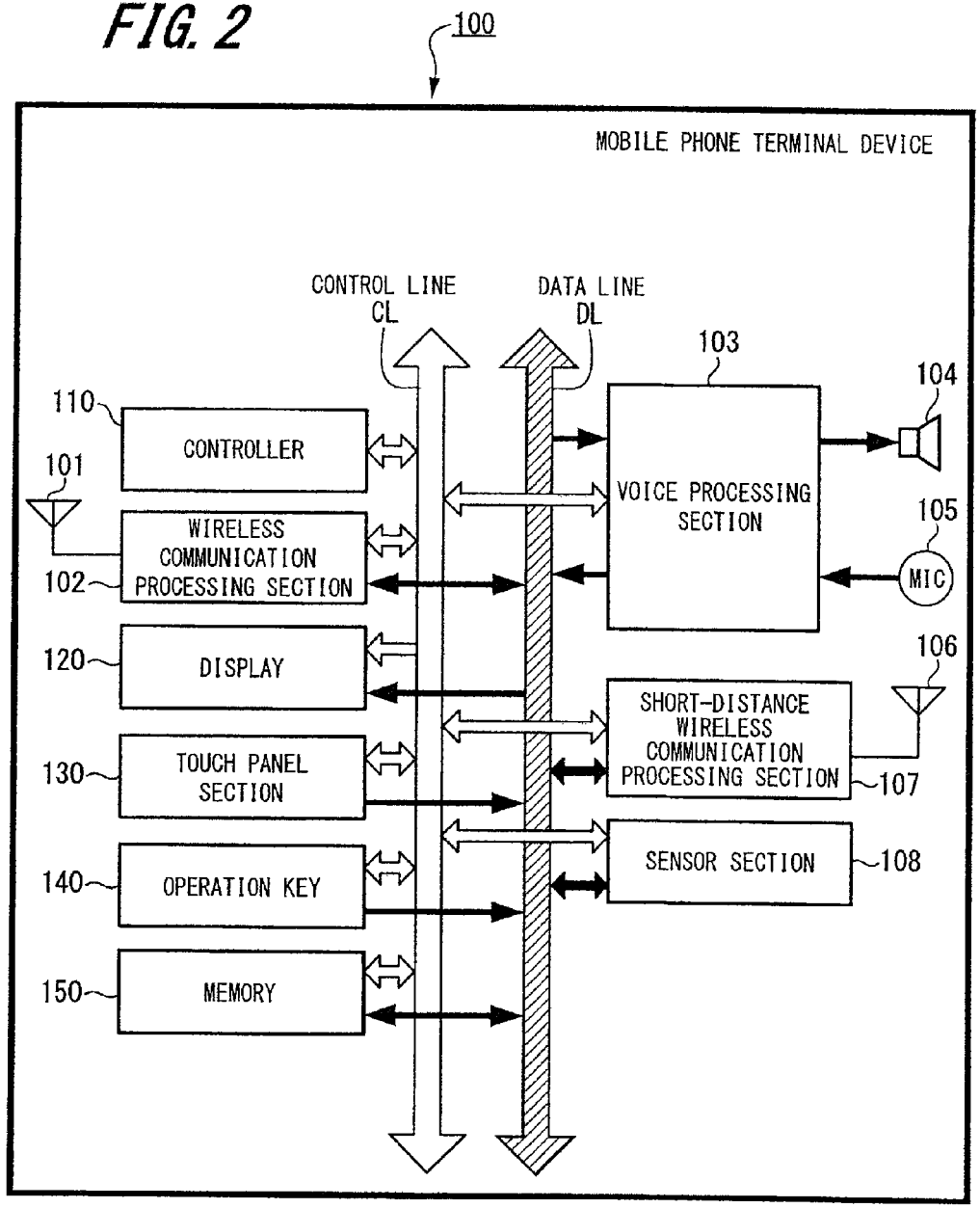
FIG. 2 illustrates schematically an exemplary mobile phone terminal device.

FIG. 2 illustrates a schematic block diagram of an exemplary mobile phone terminal device 100. As shown in FIG. 2, the mobile phone terminal device 100 may include an antenna 101 and a wireless communication processing section 102. The wireless communication processing section 102 may communicate wirelessly via radio signals, or the like, with other mobile devices via, e.g., a base station. Further, a data signal, such as a voice transmission from another user, may be received by antenna 101 and sent to the wireless communication processing section 102 for further processing. In the case of an incoming voice transmission, the voice data signal may be sent from the wireless communication processing section 102 to a voice processing section 103. Incoming voice data received by the voice processing section 103 via the wireless communication processing section 102 may be output as sound via a speaker 104.

Conversely, an outgoing voice signal may be supplied by a user to the voice processing section 103 via a microphone 105. The voice signal received via microphone 105 and processed by the voice processing section 103 may be sent to wireless communication processing section 102 for transmission by the antenna 101.

A second antenna 106 may be supplied for use with a short distance wireless communication processing section 107. The short distance wireless communication processing section 107 may communicate wirelessly with other devices over a network, such as the Internet, a local area network (LAN), or a wide area network (WAN). The second antenna 106 may, e.g., by a Wi-Fi transceiver.

A sensor unit 108 may be provided in the mobile phone terminal device 100. The sensor 108 may be a motion sensor that detects a motion of an object in the proximity of the mobile phone terminal device 100. The motion may correspond to a user moving an instruction object, such as a finger or stylus in the proximity of the mobile phone terminal device 100 for the purpose of selecting data displayed on display 120.

The mobile phone terminal device 100 may include a display 120. The display 120 may be, e.g., a liquid crystal display (LCD) panel, an organic electroluminescent (OLED) display panel, a plasma display panel, or the like. The display 120 may display text, an image, a web page, a video, or the like. For example, when the mobile phone terminal device 100 connects with the Internet, the display 120 may display text and/or image data which is transmitted from a web server in Hyper Text Markup Language (HTML) format and displayed via a web browser. The display 120 may additionally display data stored in a memory 150.

A touch panel unit 130 can detect a touch operation on the surface of the display 120. For example the touch panel 130 can detect a touch operation performed by an instruction object, such as a finger or stylus. Touch operations may correspond to user inputs, such as a selection of an icon or a character string displayed on the display 120. The touch panel 130, may be an electrostatic capacitance type device, a resistive type touch panel device, or the like which can be used for detecting a touch on a display panel.

The touch panel section 130 may perform processing related to touch operation classification. For example, the touch panel section 130 may assign a predetermined function to be performed when a "tap" touch operation is detected. Similarly, the touch panel section may analyze a touch operation in which the instruction object makes continuous contact with the display 120 while moving the instruction object around the display 120, e.g., a "swipe" operation. The touch panel section 130 may output a signal based on a classification of the touch operation performed. The signal may, for example include information indicating the touch operation classification, the location on the display 120 where the touch operation was performed, and the operation to be performed based on the touch operation.

Data which is detected and processed by the touch panel 130 can be transmitted to a controller 110. The controller 110 may include one or more processor units and can control each element of the mobile phone terminal device 100 based on data detected by the touch panel 130, or by inputs received from operation key 140. The operation key 140 may receive inputs from external control buttons included with the mobile phone terminal device 100. The external control buttons may be buttons configured to control the volume, switch ON/OFF the power, or perform a hold operation for the mobile phone terminal device 100.

The controller 110 may execute instructions stored in the memory 150. To this end, the memory 150 may be a non-transitory computer readable medium having instructions stored therein for controlling the mobile phone terminal device 100. Further, the controller 110 may include one or more processors for executing the instructions stored on the memory 150. The memory 150 may additionally store information pertaining to the prediction unit of the device. Specifically, it may store the computational results of a coefficient estimation parameter based on different criteria and the calculation of a motion vector, which are described in detail in later paragraphs with respect to the non-limiting examples illustrated in FIGS. 11A-11C and 14A-14C. In one aspect, the controller 110 may utilize a predetermined value of the estimation parameter stored in the memory 150, to execute instructions on the mobile phone terminal device 100. However, the processing features of the controller 110 are not limited to using such information, and other methods of performing these features may be utilized.

The mobile phone terminal device 100 can include a control line CL and a data line DL as internal bus lines for communication. The control line CL can be used to transmit control data from the controller 110. The data line DL may be used for the transmission of voice data, display data, or the like, throughout the various elements of the mobile phone terminal device 100.

Figure 3:
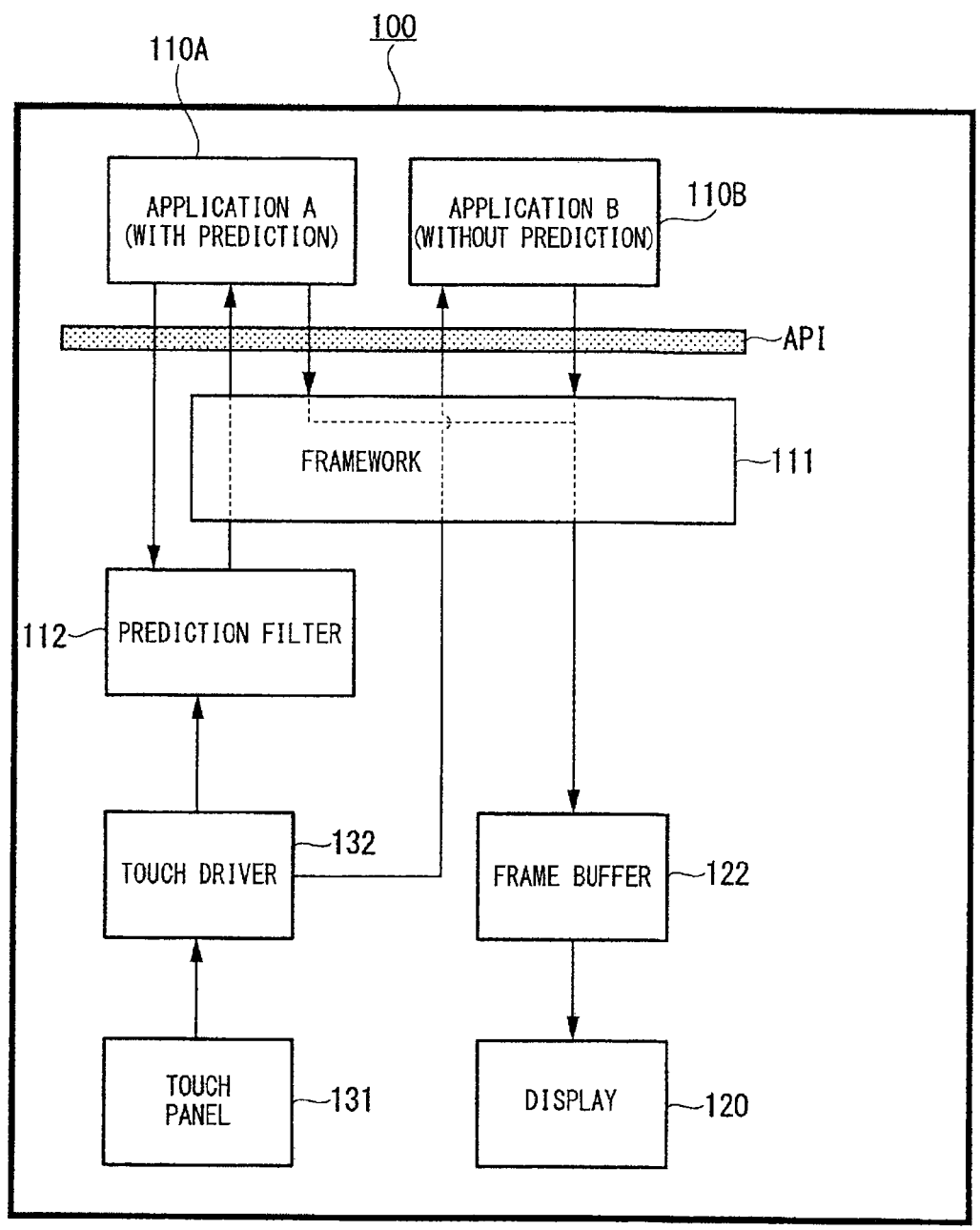
FIG. 3 illustrates schematically the structure of the control unit of the mobile device of FIG. 2.

FIG. 3 illustrates the structure of the control unit 110. The touch panel unit 130 (of FIG. 1), includes a touch panel 131 and a touch driver 132. The touch driver drives the touch panel and detects the position as indicated by a touch operation. The data corresponding to the touch position, as detected by the touch driver 132, is supplied to the control unit 110. The control unit further comprises a framework process unit 111 and a predictive filter 112. The framework process unit executes the application program in the mobile phone device 100.

Further, the control unit has an application interface (API) unit which provides a seamless mechanism to interface with different applications. As shown in FIG. 3, there may be two types of applications: application programs of type A (represented as 110A), that update a display based on a touch operation by employing the prediction unit and application programs of type B (represented by 110B), that update a display based on a touch operation without using the prediction unit 112. Note that applications such as web browsing and image processing, which comprise a slide operation (at high speeds) on the display unit can be categorized under applications of type A. On the other hand, applications such as a voice call which do not essentially require a slide operation can be categorized under applications of type B.

The framework processing unit 111, reads each application of type A and B that are executed on the mobile device through the application interface. The data (image, text etc.) obtained by the framework process unit through the application interface is buffered in the frame buffer unit 122, and is displayed via the display unit 120.

Figure 4:
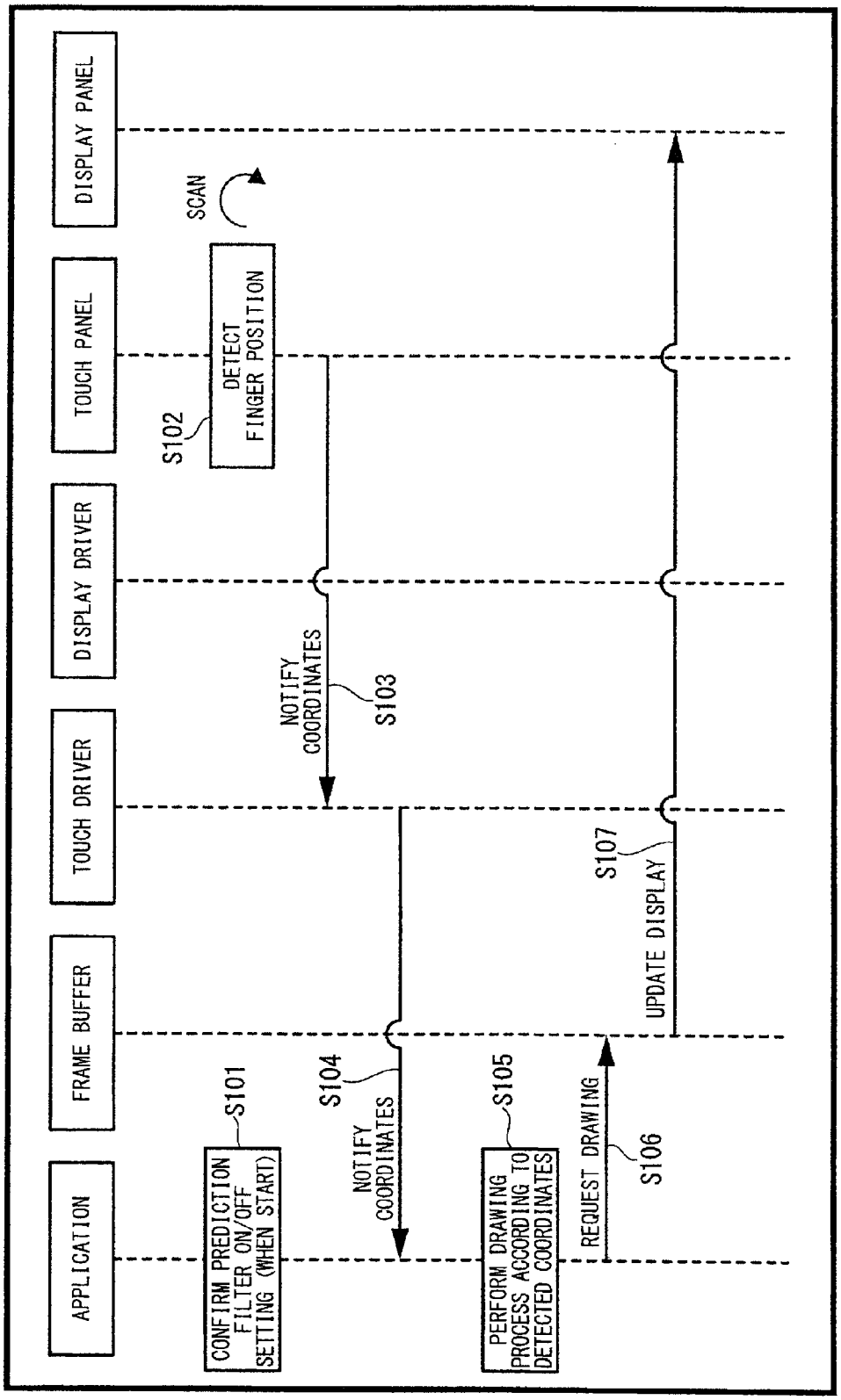
FIG. 4 illustrates an exemplary non-limiting example of the execution steps performed by an application that does not use a predictive unit.

FIG. 4 depicts the steps performed by the controller while executing an application of type B which does not use the predictive unit 112. In step S101, upon the execution of an application of type B, the prediction unit (a prediction filter) is turned OFF. The co-ordinate position corresponding to the touch position of the finger/stylus is detected by the touch panel 131, in step S102.

In step S103, the touch panel notifies the touch driver 132 of the recently acquired coordinate positions of the touch operation. In step S104, the driver 132 further transfers the acquired coordinate positions to the execution part of the application program.

In step S105, the execution part of the application program performs a drawing process thereby showing the execution condition of an application based on the acquired coordinate positions. The drawing request generated by the drawing process is transferred to the frame processing unit 111, which generates the image data in step S106. Finally, in step S107, the image data generated by the framework process unit 111, is transmitted to the display unit 120, wherein the display panel 121 is updated.

Figure 5:
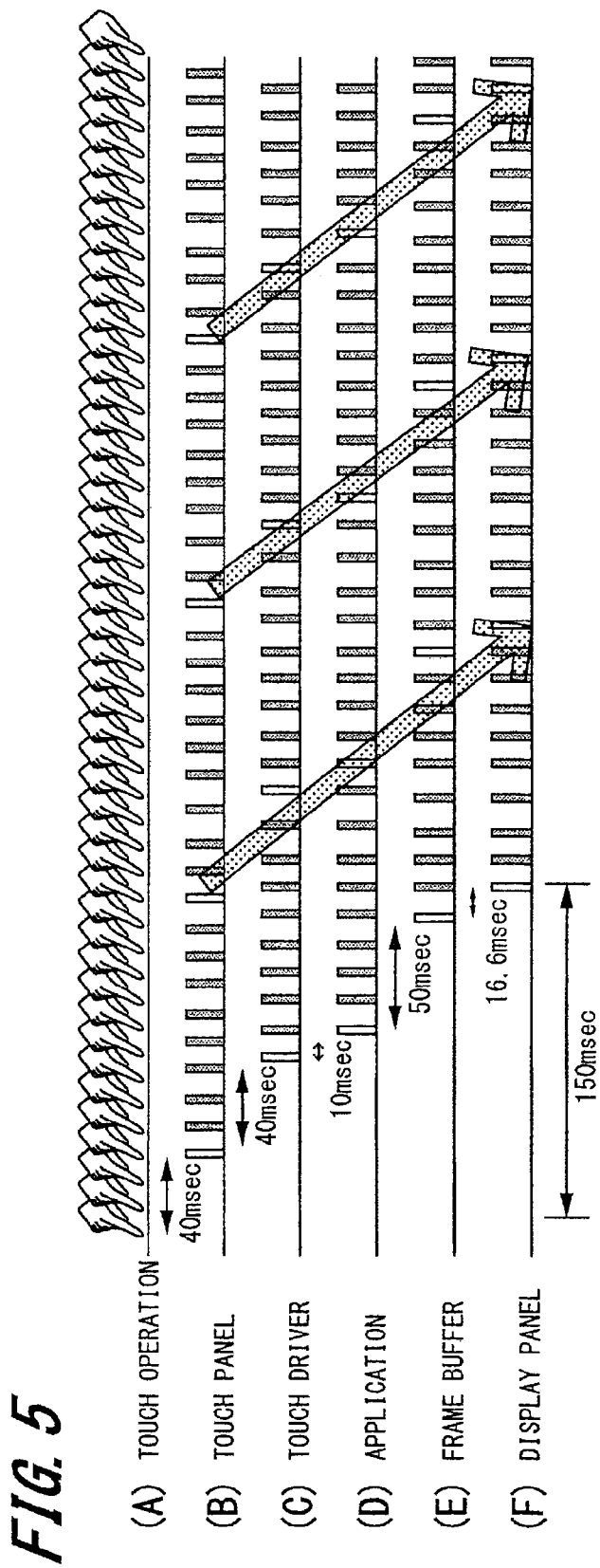
FIG. 5 illustrates an exemplary timing diagram illustrating the time-delay incurred while not using a predictive unit.

FIG. 5 illustrates a timing diagram for the case of not using a predictive unit, depicting the time elapsed from the onset of a touch operation to the time the display unit is updated.

The timing process starts as soon as a user's finger or the stylus touches the surface of the display panel 121. This is represented as item (A) in FIG. 5. The touch panel represented as item (B), detects the coordinates of the touch position after a time lag of approximately 40 ms. Note that the detection of a touch position is performed at fixed pre-determined time periods and the detection data of the touch position is output at each of the fixed time periods. The detected data captured by the touch panel is input to the touch driver 132.

The touch driver, represented as item (C), outputs the detected data of a touch position to an execution part of the application after a further time delay of approximately 40 ms. In item (D), the application program receives the detected data of the touch position from the touch driver and updates the drawing. This further incurs a time delay of roughly 10 ms.

The frame buffer 122, represented as item (E), stores the updated image data and typically requires a time of approximately 50 ms to complete this process. Finally, the image data stored in the frame buffer 122, is used to update the display panel 121, for which an additional 16.6 ms is required. Hence, overall the amount of time elapsed from the onset of a touch operation until the image of the display panel 121 is updated is approximately 150 ms, as shown in item (F).

Figure 6:
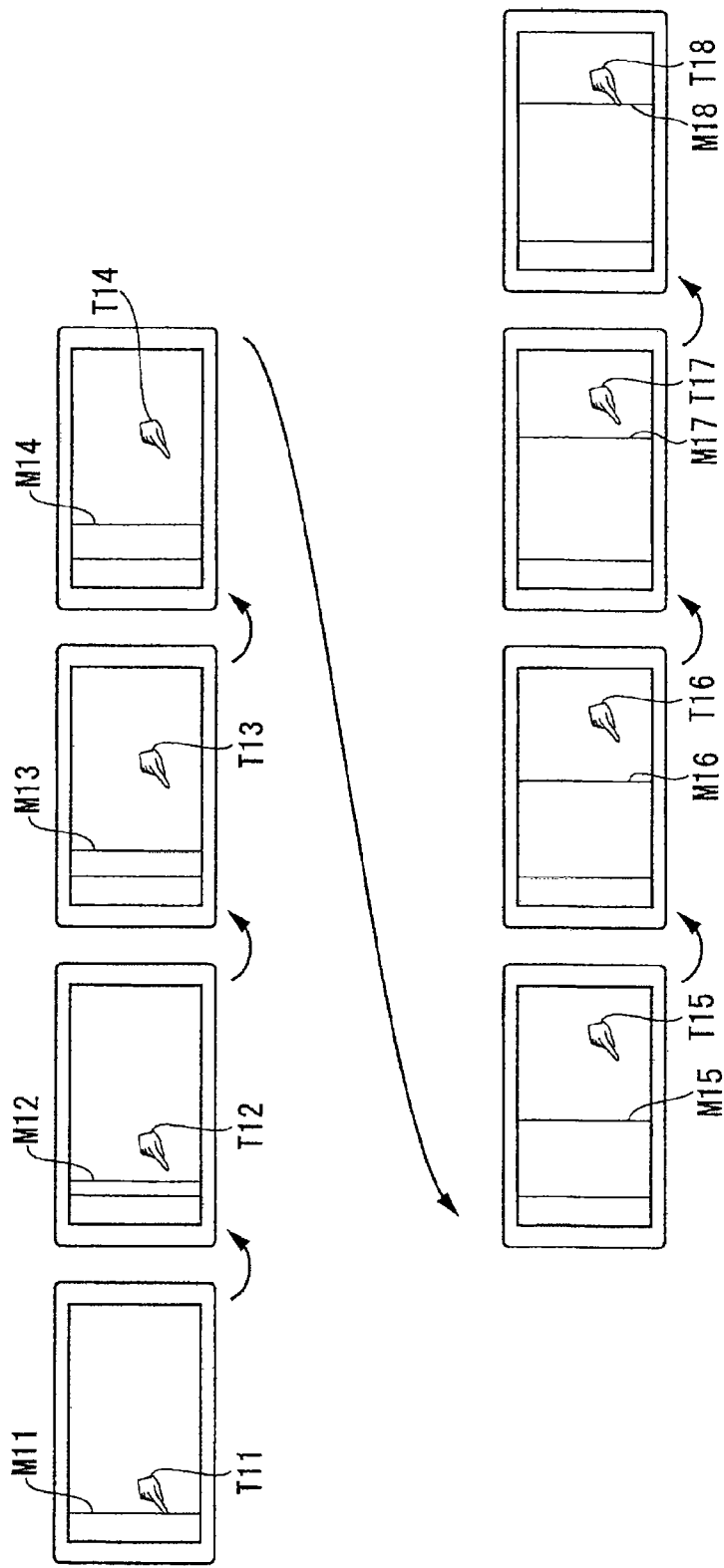
FIG. 6 illustrates a non-limiting example illustrating the disadvantages of not using a predictive unit.

FIG. 6 depicts an example of the touch operation when not using a predictive unit and shows schematically the difference in the touch and display positions from the onset of a touch operation. FIG. 6 illustrates an example of moving an object (a vertical line), represented by M11, across the screen from the left end to the right end of the screen by implementing a touch operation. M11 to M18 depict the display position of the object corresponding to the touch positions represented as T11-T18. Note that the movement of such a touch position from T11 to T18, is an example of a comparatively high-speed movement.

As shown in FIG. 6, initially the display position lags the corresponding touch position. Specifically, consider the touch positions T12-T15 and the corresponding display positions M12-M15. Note that initially, there is a offset between the touch and the display positions, i.e., the display positions do not accurately coincide with the touch positions. Initially, such an offset gradually increases as the speed of touch operation increases. As the touch position gradually approximates the final touch position T18, the offset between the touch position and the display positions decreases.

Further, by not using a predictive unit, the display position coincides with the touch position after a certain amount of time delay. It should be appreciated that although the example considers a vertical line, the object could be replaced with any other object of any shape. For example, the same principles as described above would apply, if an entire image is considered in place of the vertical line. Specifically, a similar time-lag would be obtained during the shifting of the image.

Figure 7:
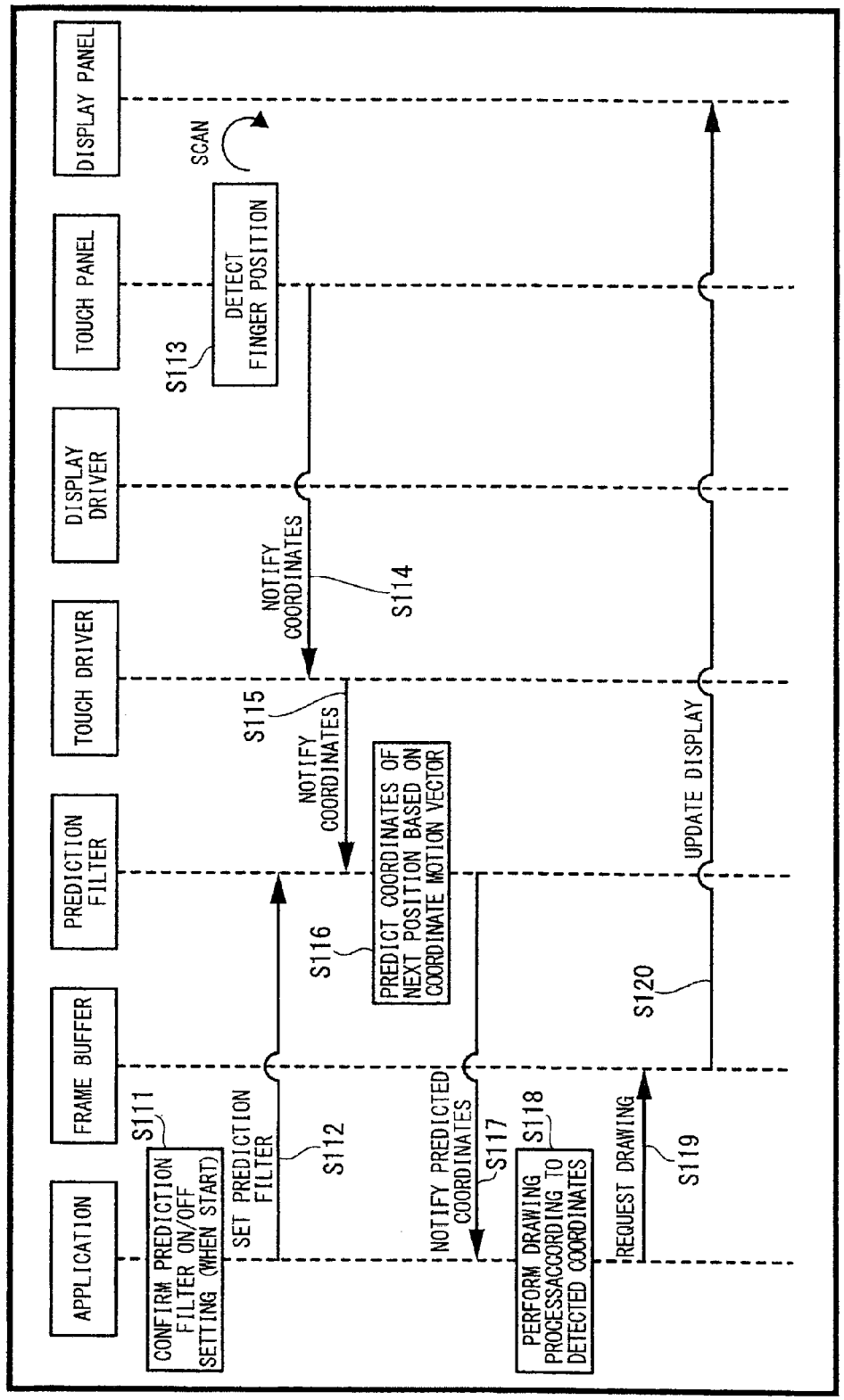
FIG. 7 illustrates an exemplary non-limiting example of the execution steps performed by an application that uses a predictive unit.

FIG. 7 illustrates the steps involved in an execution of an application that uses a predictive filter. Note that these applications are of type 110A (as shown in FIG. 3) that employ a predictive unit. In step S111, when the application program starts execution, the predictive filter is turned ON. In step S112, the application program notifies the prediction filter of the estimation parameters (to be discussed) thereby indicating that the predictive filter would perform an estimation of a coordinate position in the future.

In step S113, the coordinate position corresponding to the touch of a users finger or a stylus is detected via the touch panel 131. In step S114, the coordinate positions acquired by the touch panel are transferred to the touch driver 132. The coordinate positions acquired by the driver are input to the predictive filter 112, in step S115. In step S116, the predictive filter processes the coordinate positions and performs an estimation operation wherein it predicts the next position based on a motion vector (to be discussed).

In step S117, the coordinate positions estimated by the prediction filter are transmitted to the execution part of the application. In step S118, the execution part of the application performs the drawing process of the image based on the acquired coordinate positions. In step S119, the drawing generated by the application is transmitted to the framework process unit 111, and the image data drawn in the framework process unit is generated. Finally, in step S120 the image data produced by the framework is transmitted to the display unit 120, wherein the display panel 121 is updated.

Figure 8:
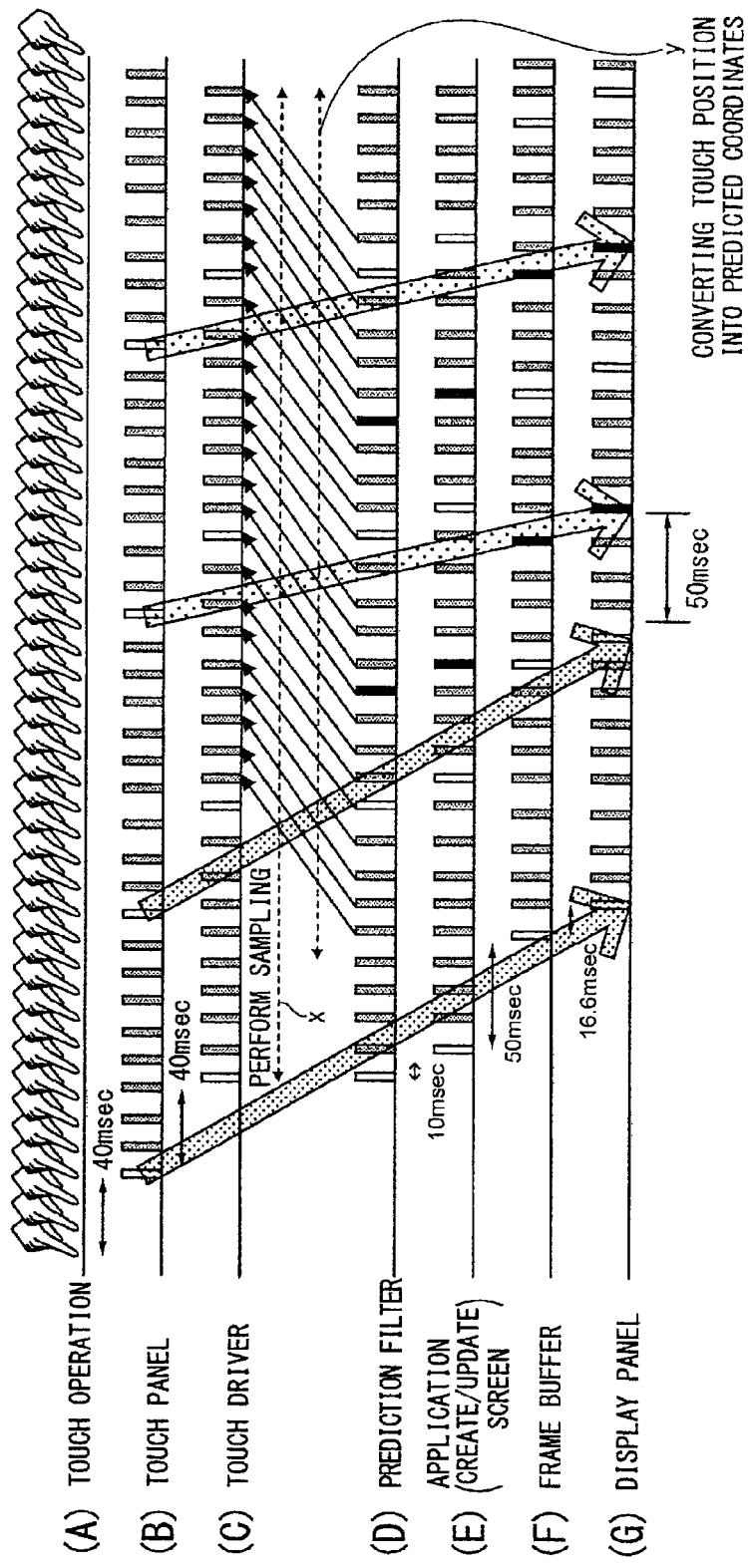
FIG. 8 illustrates an exemplary timing diagram while using a predictive unit.

FIG. 8 illustrates a timing diagram for the case of using a predictive unit, depicting the time elapsed from the onset of a touch operation to the time the display unit is updated. The timing process starts as soon as a user's finger or the stylus touches the surface of the display panel 121. This is represented by the touch operation, item (A), in FIG. 8. The touch panel 131, item (B), detects the coordinates of the touch position after a time lag of approximately 40 ms. The detection data obtained by the touch panel are further transferred to the touch driver 132, item (C). The touch driver, after a time lag of 40 msec outputs the data of the touch position to the predictive filter 112, item (D).

The predictive filter 112, performs a conversion (represented as y) of the samples (represented as x) of the touch position for obtaining an estimation of the coordinates. In doing so, the touch position, after approximately 100 ms is estimated and a motion vector (to be discussed) is obtained. Further, the execution part of the application program (item E) receives the data of the estimation coordinates of the touch position via the predictive filter. The execution part of the application utilizes 10 ms to update the image to draw in state when an estimation coordinate position is touched. Finally, the updated image is stored in the frame buffer, item (F), and requires approximately 50 ms to complete this step, where after the display panel 121, item (G), is updated in 16.6 msec. Thus, with the use of a predictive filter, the time required to estimate the touch position is 100 ms, thereby reducing the time lag by 50 msec.

Figure 9:
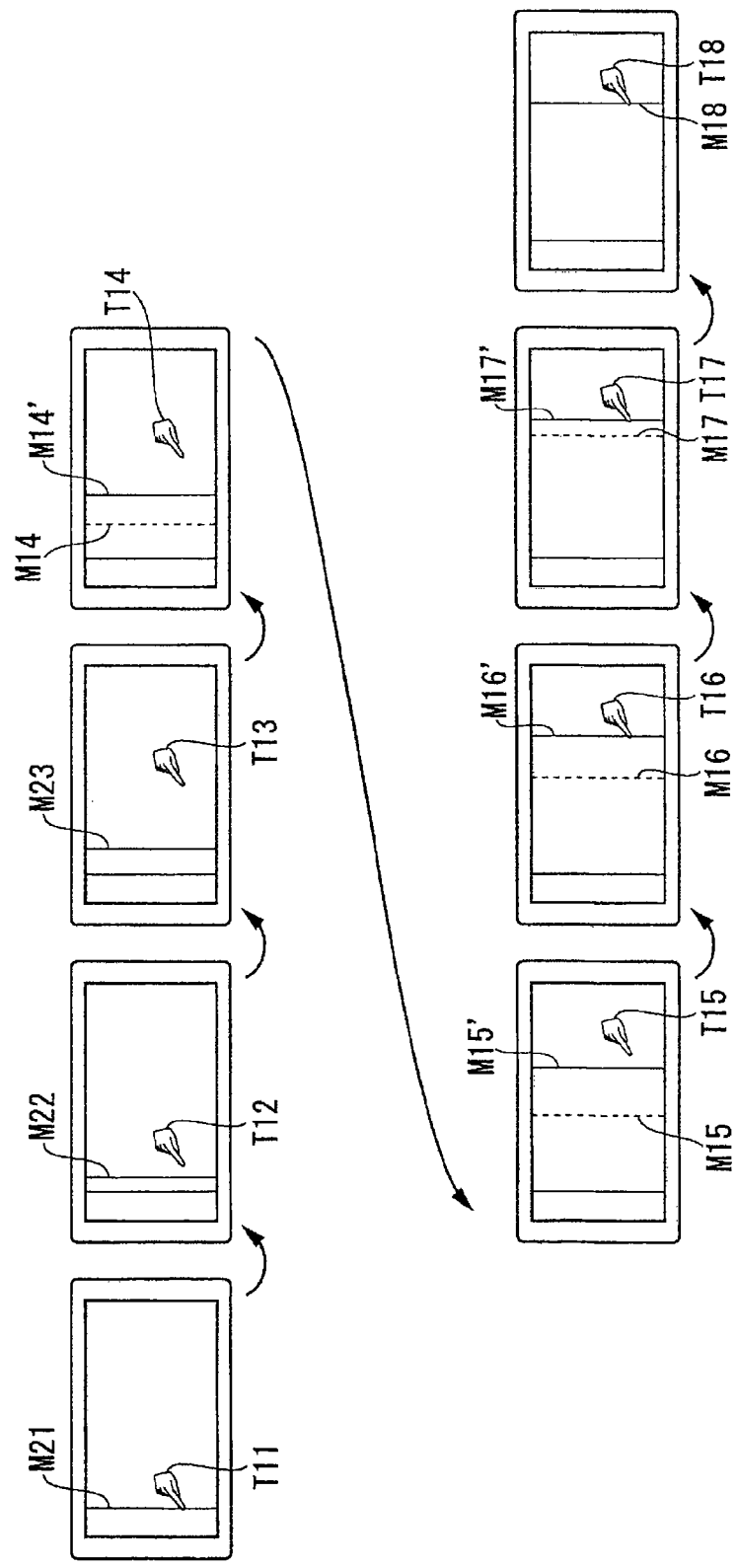
FIG. 9 illustrates an exemplary non-limiting example illustrating the advantages of using a predictive unit.

FIG. 9 depicts an example of the touch operation when using a predictive unit and shows schematically the positions of the touch operation and the display positions from the onset of a touch operation. Further, it also shows the corresponding positions when not utilizing a predictive unit. Similar to the example considered in FIG. 6, and for the sake of simplicity, a vertical line is considered as the moving object, that moves from the left end of the display to the right end of the display.

In the example of FIG. 9, an estimation operation is initiated (after a certain time period) by the predictive unit after the touch panel detects a movement of the touch position. Note that the estimation process is explained later with reference to FIGS. 10 and 11. As compared with the display position M14 of the object when not using a predictive unit, the predictive unit 112 in the present case, estimates the display position M14' approaching the touch position T14.

Hereinafter, the predictive unit (filter) estimates the future positions M15'-M17' corresponding to the touch positions M15 to M17. Note that as compared to the case while not using the predictive filter, the display positions while using the predictive unit are considerably closer to the actual touch positions. It should be appreciated that although the example considers a vertical line, the object could be replaced with any other object of any shape. For example, the same principles as described above would apply, if an entire image is considered in place of the vertical line.

FIG. 10, illustrates an example of the method used by the predictive filter to estimate the coordinate position of a touch operation. Consider that positions P1 and P2 are initially detected at two sampling instants. The predictive filter starts the estimation process by first obtaining a motion vector V1, which is defined as a vector that originates at touch position P1 and terminates at the touch position P2. Further to estimate the next touch position, the predictive unit extends the calculated motion vector V1, by a amount determined by a estimation coefficient value (to be discussed next with reference to FIGS. 12 and 15).

When the estimation coefficient value is a high value, a coordinate position P3' is determined. Note that this position is slightly further away from the actual touch position which is depicted as P3. On the contrary, when the determined value of the estimation coefficient is a low value, a touch position estimated by P3" is obtained. Note that this position is slightly ahead of the original P3 touch position.

In one aspect of the present disclosure, FIGS. 11A-11C depict an illustration of how the control unit 110 sets the conditions to decide if the predictive unit 112, should be enabled to estimate a position of the touch operation. In this non-limiting example the control unit uses the criterion of speed (rate of change of touch position) in order to determine if the predictive unit should be activated. With reference to FIG. 11 and for sake of simplicity, let us assume that the control unit determines that it would use a moving speed (of the touch operation on the display panel 121), within the range of 10-20 mm/sec in order to activate the predictive unit. Note that the moving speed of the touch position can be determined by the magnitude of the motion vector as explained in FIG. 10. In what follows, three scenarios that one may encounter while determining the activation of the predictive unit are explained in detail.

As shown in FIG. 11A, consider that in a certain time interval the touch position has changed from position T21 to position T22. Further, the motion vector from position T21 to position T22 is represented by vector V11. The control unit detects the rate of change of touch position (i.e., speed) and determines that the speed of the motion vector is less than 10 mm/sec. Thus, the control unit determines that the predictive unit 112, will not perform the estimation operation. A similar situation is depicted in FIG. 11C, wherein in a certain time interval the touch position has changed from position T25 to position T26. Further the motion vector from position T25 to position T26 is represented by vector V13. The control unit detects the rate of change of touch position, and determines that the speed of the motion vector is greater than 20 mm/sec and hence does not perform the estimation operation.

FIG. 11B depicts the case wherein in a certain time interval the touch position has changed from position T23 to position T24, and the motion vector joining the two touch positions is represented by V12. In this case, it is determined that the magnitude of the motion vector is in the predetermined range of 10-20 mm/sec, and hence the control unit estimates the touch position via the predictive unit 112. Moreover, while estimating the touch position using the method described above, the predictive unit also determines a variable setting for the estimation coefficient value, as explained below.

Figure 12:
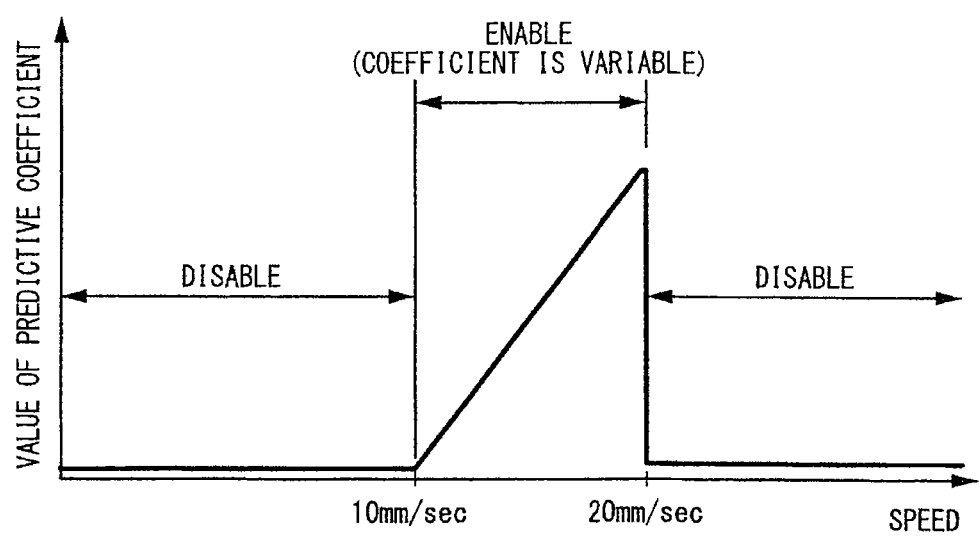
FIG. 12 depicts a graph that illustrates the behavior of the prediction coefficient parameter according to one aspect of the present disclosure.

FIG. 12, shows the change of the estimation coefficient value of the predictive unit 112, in case of performing the method as depicted in FIG. 11A-11C. As shown in FIG. 12, for speeds lower than 10 mm/sec and for speeds greater than 20 mm/sec, the control unit disables the estimation operation performed by the predictive unit. For speeds in the range of 10-20 mm/sec the control unit enables the estimation operation of the predictive unit. Further, as shown in this non-limiting example, a variable range for the coefficient value is used. Specifically, if the value determined for the estimation coefficient is a large value the estimated position is slightly further away from the actual touch position. This is depicted in FIG. 10 by the position P3'. If the value of the estimation coefficient is a small value, the estimated touch position is slightly ahead of the original touch position. This is depicted as P3" in FIG. 10. Further, it must be appreciated that the method for setting the estimation coefficient value is not limited to the speed range as depicted in FIG. 12. A user may select any speed range to base the decision as to whether or not to the estimation operation of the predictive unit is activated. Moreover, although in the example of FIG. 12, it was presupposed that the estimation coefficient value at the time of using the predictive filter is of a variable form, the control unit 110 may opt to use a predetermined fixed value for the estimation coefficient or use a series of steps to determine the coefficient value.

FIG. 13 is a flowchart of the process performed by the controller while using the predictive unit. In this case, the decision criteria of whether or not to use the predictive unit is based on the moving speed of the touch position.

In step S11, the control unit queries the application under consideration to check if it is of type 101A or 101B. Specifically, the control unit checks if the application is one that requires/enables the predictive unit. If the response to the query is negative, the process moves to step S12 wherein the control unit disables the prediction filter.

In step S13, the display/touch panel 130, awaits for a touch operation. On detecting a touch, the control unit performs a normal touch process wherein the control unit updates the display according to the application. In step S15, a query is made to check if the application under consideration has completed execution. If the response to the query is affirmative, the process exits the application and ends the process. However, if the response to the query is negative, the process loops back to step S13, wherein the display panel awaits for another touch operation.

If the response to the query in step S11 is affirmative, the process moves to step S16 wherein the control unit 110 enables the prediction unit 112. In step S17, the touch panel 130 awaits for a touch operation. In step S18, on detecting a touch, the touch panel 130 samples the detected touch position within a fixed time period. Further, the predictive filter 112, detects the speed/rate of change of touch position based on the sampled touch position.

In step S19, the control unit queries if the speed determined in step S18 is within a specific range that is predetermined by the control unit, in order to enable the prediction unit. If the response to the query is negative the process proceeds to step S21, wherein the control unit does not use the prediction unit 112, but instead uses the touch position detected by the touch panel 130 to execute the application. Therein after the process proceeds to step S23, where a query is made to check if the application has completed execution. If the response to the query is affirmative, the process exits the application and ends the process. However, if the response to the query is negative, the process loops back to step S17, wherein the display panel awaits for another touch operation.

If the response to the query in step S19 is affirmative, the process continues to step S20. In step S20, a second query is made if the prediction unit can successfully predict the coordinate positions. If the response to the query is affirmative the process moves to step S22, where the predictive unit 112 sets an estimation coefficient value corresponding to the speed detected in step S18 and estimates a touch position. Finally, using the estimated touch position the control unit executes the application and proceeds to step S23 to check is the application has completed its execution.

In another aspect of the present disclosure, FIGS. 14A-14C depict an illustration of how the control unit 110 sets the conditions to decide if the predictive unit 112 should be enabled to estimate a position of the touch operation. In this example, the control unit uses the criterion of area/moving direction of a touch position in order to determine if the predictive unit should be activated.

While using the criterion of area for deciding the enablement of the predictive unit, the control unit divides the display panel 121, into two distinct areas: a central area represented as 121a and a peripheral area 121b as shown in FIG. 14A. Based on this distinction of the display panel area, the control unit decides the enablement of the predictive unit according to the following three scenarios:

In FIG. 14A, an initial touch position represented by T31, lies in the central area of the display panel 121. In a certain time interval, a second touch position is detected which is represented by T32. Note that the position T32 is also located in the central area of the display panel. A motion vector joining the two touch positions is depicted by the vector V21. In this scenario, as both the initial and final touch positions lie in the central area of the display panel, the control unit 110 activates the prediction unit 112 and uses it in the estimation operation to detect a touch operation.

Similarly FIG. 14B depicts a scenario wherein the initial touch position (T33) lies in the peripheral area of the display panel, and the second touch position (represented by T34) lies in the central area of the display panel. Further, the two positions are connected by the motion vector V22. The control unit in this case, activates the predictive unit 112, and uses it in the estimation operation to detect a touch operation.

As compared to the above two cases, consider the scenario wherein the motion vector detected by the touch panel 130, has an initial position that lies in the central area and a final position which lies in the peripheral area. In such an instance, the control unit disables the predictive unit 112. For example, as depicted in FIG. 14C, a displacement is shown from an initial position (T35), which lies in the central area of the display panel to a second position (T36) which lies in the peripheral area of the display panel. The positions T35 and T36 are connected by the motion vector T36. The control unit 110, in this case does not enable the prediction unit 112.

Moreover, it must be noted that the control unit uses the predictive filter 112 to perform an estimation of the touch operation depending on the magnitude of the detected motion vector. In doing so, it provisions for the changing of the coefficient evaluation value which is described next with reference to FIG. 15.

FIG. 15 illustrates how the coefficient evaluation value may be changed based on the detection of the motion vectors as described in FIGS. 14A-14C. In one aspect of the present disclosure, the coefficient estimation value may be changed depending on the area which encapsulates the motion vector. Specifically, when the motion vector as depicted in FIG. 14A and FIG. 14B is detected by the touch panel 130, there is a change in the value of the estimation coefficient. Note that the change of the estimation value takes place in time when the control unit 110 decides if it will enable the prediction unit 112. Further, the estimation coefficient is assigned a non-zero value when the prediction unit is disabled.

In another aspect of the disclosure, a distance criterion may be used to enable a change in the value of the estimation coefficient. More specifically, a certain predetermined threshold distance can be set and the distance (displacement) of the motion vector as detected by the touch panel can be compared to the set threshold value. When the displacement of the motion vector is within the threshold limit, there is no change in the value of the estimation coefficient. When the distance of the motion vector exceeds the threshold, it results in a large value being set for the estimation coefficient. Keep in mind that a large value for the estimation coefficient results in the estimated position being slightly further away from the actual touch position, as indicated in FIG. 10.

It must be appreciated that the above mechanism of changing the value of the estimation coefficient parameter is merely for illustrative purposes. It is not to be construed as being limiting to the operation of the control unit 110. For example, instead of using the linearly changing estimation coefficient value as depicted in FIG. 15, one may set the value of the estimation coefficient to a fixed predetermined value.

Figure 16A:
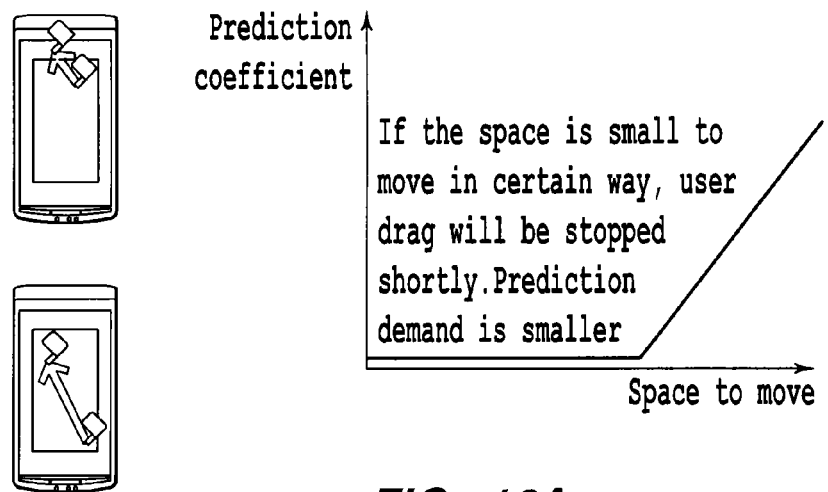
FIGS. 16A and 16B illustrate the behavior of the prediction coefficient parameter based on the available space to operate on the touch panel of the mobile phone terminal device.
Figure 16B:
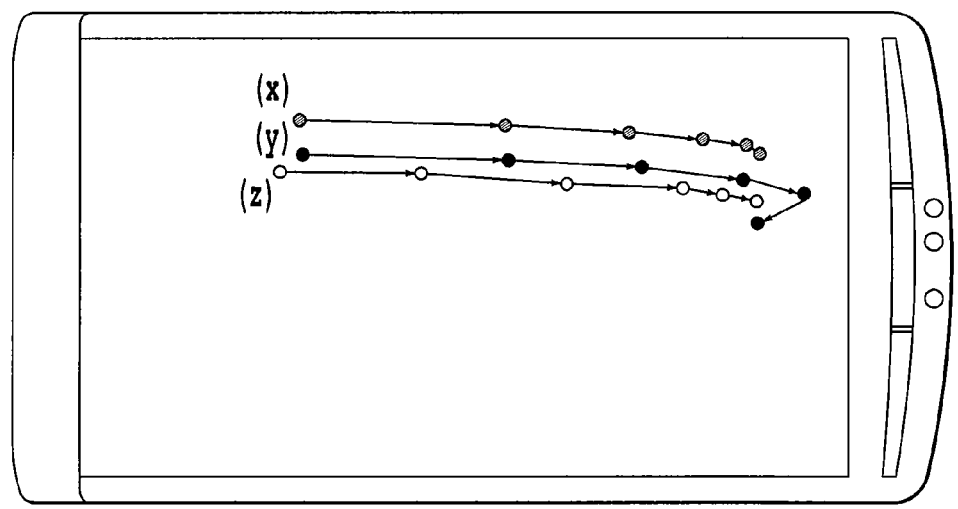

FIGS. 16A and 16B illustrate the relationship between the available space to operate on the touch panel of the mobile phone terminal device and the prediction coefficient parameter, and depict the advantage of dynamically adjusting the value of the prediction coefficient in order to avoid a backward motion. The prediction coefficient parameter needs to be adjusted depending on the space available to a user to perform the drag operation.

FIG. 16A depicts two scenarios, namely 'small space' and 'big space' available to a user to perform the drag operation. Corresponding to the two scenarios, the graph illustrates a change in the prediction coefficient parameter based on the available space. While performing the drag operation, if the user's finger (or stylus) approaches the edge of the touch panel, there is a little space available for further dragging. Hence, there is no specific need to apply the prediction mechanism to predict the future coordinates. Rather, stopping smoothly is an essential requirement and is thus prioritized over the prediction. The small space scenario is depicted in the graph as having a very low prediction coefficient value.

Contrarily, when there is more space available to the user to perform the drag operation, applying the prediction mechanism to predict the future coordinates of the touch position is valid and as shown in the graph, the value of the prediction coefficient parameter changes linearly with the amount of space available to the user to perform the drag operation.

Note that adjusting the prediction coefficient parameter based on the available space helps avoid 'backward motion', wherein the predicted coordinates significantly lag with respect to the motion of the user's finger or stylus. Such a situation often occurs due to a rapid change in the speed of the user's drag operation.

FIG. 16B depicts an example of how the backward motion can be avoided and illustrates the advantage of adjusting the prediction coefficient parameter with respect to the available space. In FIG. 16B, trace (Y) represents the trace of a user's finger or stylus when the prediction does not adjust the value of the coefficient parameter based on the available area. Notice, that as the users finger approaches (in a forward direction) the edge of the mobile device, the prediction in fact predicts a backward position when in fact the users finger approaches the edge of the device. This occurs because the prediction coefficient parameter is not adjusted as the user's finger approaches the edge of the device.

Trace (x) represents the trace of the user's finger or stylus when the prediction adjusts the value of the coefficient parameter based on the available area. In this case, as the user's finger approaches the edge of the device, the value of the prediction coefficient parameter is reduced and thus an overshoot of the prediction coordinates is avoided. In this manner, adjusting the value of the prediction coefficient parameter helps avoid the backward motion and predicts a coordinate position that corresponds to the actual touch position of the user. Note that trace (z) represents a set of raw coordinates obtained from the mobile phone terminal device.

FIG. 17 is a flowchart of the process performed while using the predictive unit, wherein the decision criteria is based on the area which encapsulates the motion vector. The steps S11-S15 are similar to those depicted in FIG. 13, and account for the case wherein the application under consideration is one which does not enable the predictive unit 112.

If the application under consideration is one which enables the predictive unit, the process follows steps S16-S18 which are similar to those described in FIG. 13. However, in step S24, a query is made if the touch operation was performed in a region wherein the prediction filter is applicable. If the response to the query is affirmative the process moves to step S20, where a second query is made if the prediction unit can successfully predict the coordinate positions. If the response to the query is affirmative the process moves to step S22, wherein the predictive unit 112, sets an estimation coefficient value as described above with reference to FIG. 15. Finally, by using the estimated touch position the control unit executes the application and proceeds to step S23 to check is the application has completed its execution.

Figure 18:
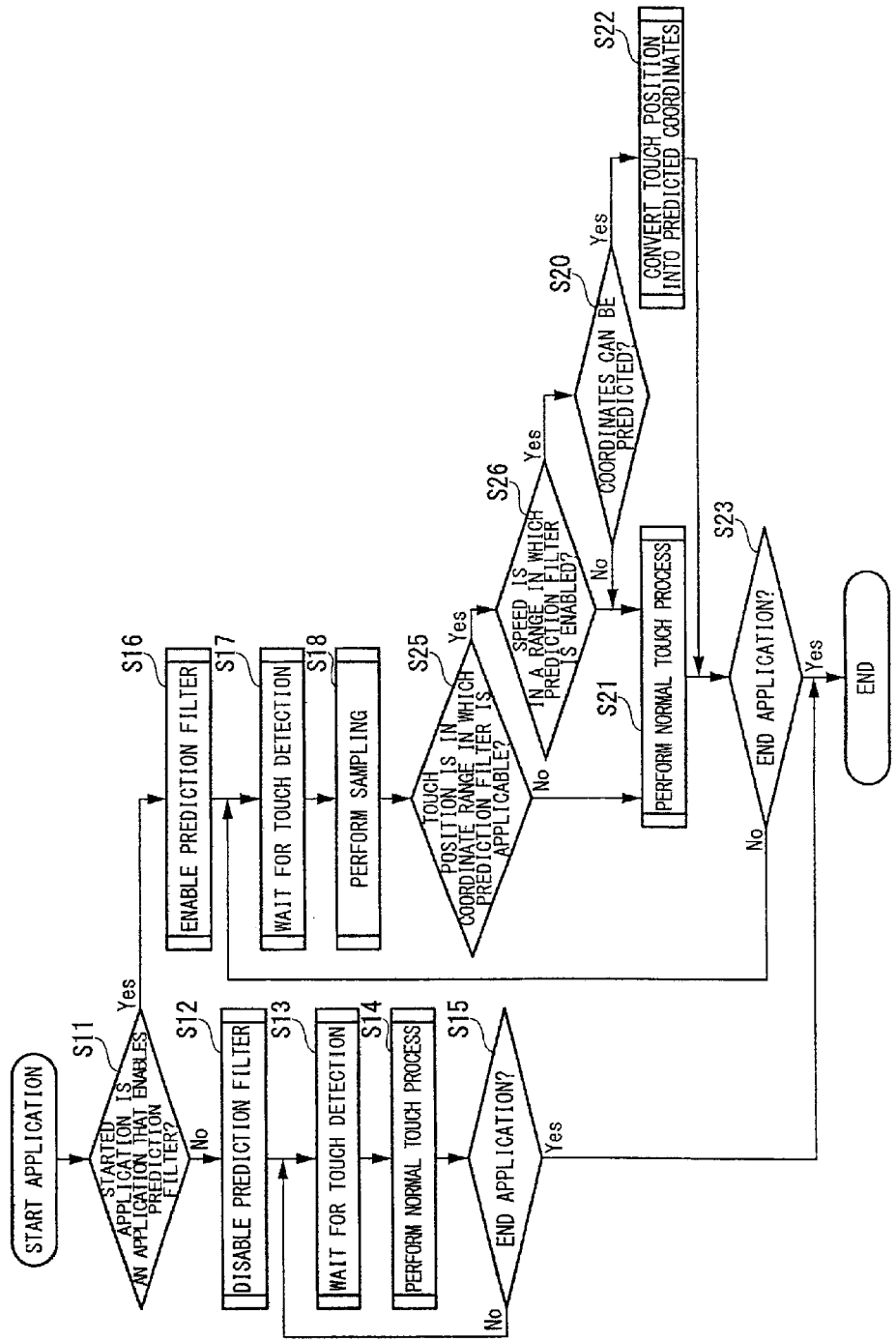
FIG. 18 is a flowchart according to a third aspect of the present disclosure, outlining the steps performed by the control unit while employing a predictive unit.

FIG. 18 presents another aspect of the disclosure, wherein the decision to use the predictive unit is based on a combination of criteria comprising the area in which the motion vector is detected as well as the speed/rate of change of the motion vector. As shown in FIG. 18, the steps S11-S15 are similar to those depicted in FIG. 13 and account for the case wherein the application under consideration is one which does not enable the predictive unit 112. If the application under consideration is one which enables the predictive unit, the process follows steps S16-S18 which are similar to those described in FIG. 13.

In step S25, a first query is made to check if the touch operation was performed in a region wherein the prediction filter is applicable. If the response to the query is affirmative the process moves to step S26, where a second query is made to check the speed/rate of change of motion vector. Specifically, a query to check if the speed determined in step S18 is within a specified range that is predetermined by the control unit in order to enable the prediction unit. If the response to the query is affirmative the process moves to step S22, wherein an estimation is made via the predictive unit 112 of the touch position. Note however that if the response to the query in either step S25, S26 or S20 is negative, the process moves to step S21, wherein the control unit does not use the prediction unit 112, but instead uses the touch position detected by the touch panel 130 to execute the application. Similar to the process depicted in FIG. 13, a final query is made in step S23 to check if the application has completed its execution.

Figure 19:
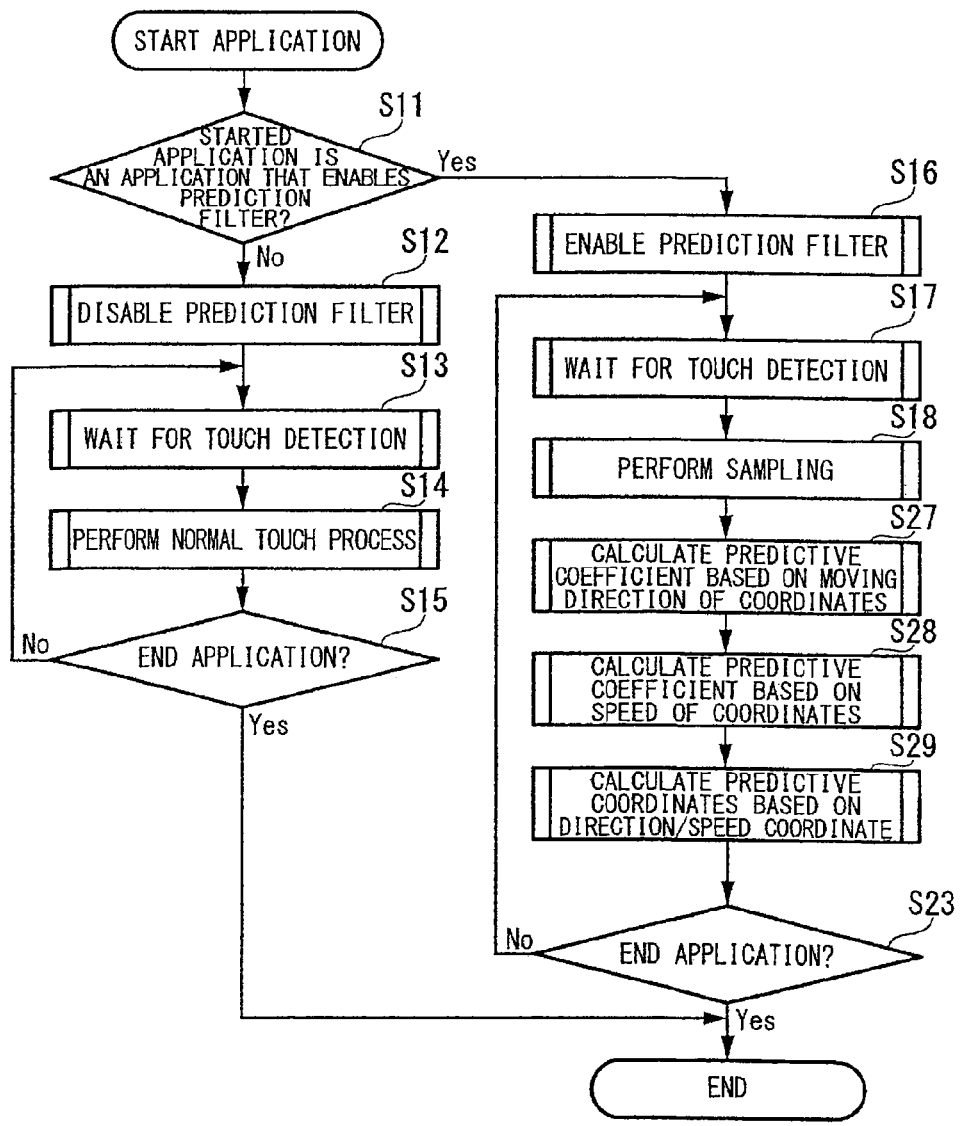
FIG. 19 is a flowchart illustrating the steps performed to calculate the value of the estimation coefficient parameter.

FIG. 19 depicts a flowchart of the process performed in order to determine the value of the estimation coefficient parameter. In step S11, the control unit queries the application under consideration if it uses a predictive unit (predictive filter) for estimating touch positions. If the response to the query is negative, the process moves to step S12 wherein the control unit disables the prediction filter. In step S13, the display/touch panel 130, awaits for a touch operation. On detecting a touch, the control unit performs a normal touch process wherein the control unit updates the display according to the application. In step S15, a query is made if the application under consideration has completed execution. If the response to the query is affirmative, the process exits the application and ends the process. However, if the response to the query is negative, the process loops back to step S13, wherein the display panel awaits for another touch operation.

If the response to the query in step S11 is affirmative, the process moves to step S16 wherein the control unit 110 enables the prediction unit 112. In step S17, the touch panel 130 awaits for a touch operation. In step S18, on detecting a touch, the touch panel 130 samples the detected touch position within a fixed time period.

In step S27, the control unit determines the value of the estimation coefficient based on the moving direction of the coordinates detected in step S18. For example, when the detected direction is from the periphery of the display panel to the central area of the display panel, the control unit may enlarge (increase) the value of the coefficient parameter. Moreover, if the direction is one which moves towards the peripheral area from the central area of the display panel, the control unit 110 may assign a small value to the estimation coefficient parameter.

In step S28, the control unit 110, computes the value of the estimation coefficient parameter based on the moving speed of the coordinates detected in step S18. When the speed is within a pre-determined range the control unit may enlarge (increase) the value of the parameter as opposed to lowering the value of the estimation coefficient parameter as in a case when the speed is either greater/lower than the pre-determined speed range.

Finally in step S29, the control unit calculates a final value for the estimation coefficient parameter based on the calculations performed in steps S27 and S28. In one embodiment of the present disclosure, the control unit multiples the values of the estimation coefficient obtained in steps S27 and S28 to obtain a final value for the parameter. In another embodiment, the control unit may add the two estimates (of steps S27 and S28) to obtain the final value. Note that these mechanisms are in no manner limiting to the operation of the control unit to calculate the final value of the estimation coefficient parameter and serve only as illustrative examples. Any other mathematical operation may be applied to the estimates obtained in steps S27 and S28 to achieve a final value for the estimation coefficient parameter.

Obviously, numerous modifications and variations of the present invention are possible in light of the above teachings. It is therefore to be understood that within the scope of the appended claims, the invention may be practiced otherwise than as specifically described herein. For example, the display 120 shown in FIGS. 1, 6, 10 and 11 may be configured differently than those illustrated in the figures. Further, the value of the estimation coefficient parameter may be computed in a manner similar to those in the present disclosure. Specifically, the controller may compute the estimation coefficient parameter based on the speed of the motion vector and the direction of the motion vector as illustrated in FIGS. 12 and 15, and may further compute a final value of the estimation coefficient parameter based on a mathematical function that takes as inputs the estimation coefficient parameters calculated by the above methods.

Additionally, devices other than the mobile phone terminal device 100 shown in FIG. 1 may also be used to perform the features discussed in present disclosure. For example, aspects of the present disclosure may be executed on a smart phone, a tablet, a general purpose computer, a laptop, an electronic reading device, or other such display terminals.

The above disclosure also encompasses the embodiments noted below.

(1) An information processing apparatus comprising: a display configured to indicate a display position corresponding to a touch input; a touch sensor formed integrally with the display and configured to detect the touch input; and a circuitry configured to receive coordinate positions corresponding to the touch input from the touch sensor; sample the coordinate positions corresponding to the touch input; calculate a motion vector corresponding to the touch input based on the sampling of the coordinate positions of the touch input; compute a coefficient estimation parameter for the motion vector based on a predetermined condition; and control the display to indicate a display position corresponding to a predicted future touch input based on the coefficient estimation parameter.

(2) The information processing apparatus of (1), wherein the circuitry is configured to calculate the motion vector as a motion vector that originates at a first sampled touch position and terminates at a second sampled touch position.

(3) The information processing apparatus of (1), wherein the predetermined condition is based on a speed corresponding to the motion vector.

(4) The information processing apparatus of (3), wherein the circuitry determines that the predetermined condition is satisfied when the speed corresponding to the motion vector is within a predetermined speed range.

(5) The information processing apparatus of (1), wherein the circuitry is configured not to perform the estimation if the speed corresponding to the motion vector is outside the predetermined speed range.

(6) The information processing apparatus of (1), wherein the circuitry is configured to compute a value of the coefficient estimation parameter that is variable within the predetermined speed range.

(7) The information processing apparatus of (1), wherein the circuitry is configured to compute a value of the coefficient estimation parameter that is fixed within the predetermined speed range.

(8) The information processing apparatus of (4) wherein the circuitry is configured to increase the value of the coefficient estimation parameter when the detected motion vector is within the predetermined speed range, and decrease the value of the coefficient estimation parameter when the motion vector is outside the predetermined speed range.

(9) The information processing apparatus of (1) wherein the predetermined condition is based on an area of the display panel which encapsulates the motion vector.

(10) The information processing apparatus of (9), wherein the circuitry determines that the predetermined condition is satisfied when the motion vector lies in a central area of the display panel.

(11) The information processing apparatus of (9), wherein the circuitry determines that the predetermined condition is satisfied when the motion vector is directed from a peripheral area to the central area of the display panel.

(12) The information processing apparatus of (9), wherein the circuitry determines that the predetermined condition is not satisfied when the motion vector is directed from the central area to the peripheral area.

(13) The information processing apparatus of (9), wherein the circuitry is configured to decrease the value of the coefficient estimation parameter when the detected motion vector approaches an edge of the display, and increase the value of the coefficient estimation parameter when the motion vector is in the central area of the display.

(14) The information processing apparatus of (1), wherein the predetermined condition is based on a speed corresponding to the motion vector and on an area of the display panel which encapsulates the motion vector.

(15) The information processing apparatus of (13), wherein the circuitry determines that the predetermined condition is satisfied when the speed corresponding to the motion vector is in a predetermined speed range and the motion vector terminates in the central area of the display panel.

(16) The information processing apparatus of (10), wherein the circuitry is configured to increase the value of the coefficient estimation parameter when the motion vector is directed from a peripheral area to a central of the display panel, and decrease the value of the coefficient estimation parameter when the motion vector is directed from the central area to the peripheral area of the display panel.

(17) The information processing apparatus of (13), wherein the circuitry is configured to compute the coefficient estimation parameter based on the speed corresponding to the motion vector and on the area of the display panel which encapsulates the motion vector.

(18) An information processing method performed by an information processing apparatus, the method comprising: displaying a display position corresponding to a touch input; detecting a touch input by a touch sensor; receiving coordinate positions corresponding to the touch input; sampling the coordinate positions corresponding to the touch input; calculating a motion vector corresponding to the touch input based on the sampling; computing by a circuitry a coefficient estimation parameter for the motion vector based on a predetermined condition; and controlling the display to indicate a display position corresponding to a predicted future touch input based on the computing.

(19) A non-transitory computer-readable medium including computer program instructions, which when executed by an information processing apparatus, cause the information processing apparatus to perform a process, the process comprising: displaying a display position corresponding to a touch input; detecting a touch input by a touch sensor; receiving coordinate positions corresponding to the touch input; sampling the coordinate positions corresponding to the touch input; calculating a motion vector corresponding to the touch input based on the sampling; computing by a circuitry a coefficient estimation parameter for the motion vector based on a predetermined condition; and controlling the display to indicate a display position corresponding to a predicted future touch input based on the computing.

The invention claimed is:
1. An information processing apparatus comprising:
a display configured to indicate a display position corresponding to a touch input;
a touch sensor formed integrally with the display and configured to detect the touch input; and
circuitry configured to
divide the display into a first area and a second area;
receive coordinate positions corresponding to the touch input from the touch sensor;
sample tile coordinate positions corresponding to the touch input;
calculate a motion vector corresponding to the touch input based on the sampling of the coordinate positions of the touch input;
determine whether a predetermined condition is satisfied, the predetermined condition comprising a condition that the motion vector lies entirely in or terminates in the first area and a condition that a speed of the motion vector is in a predetermined speed range;
if the predetermined condition is satisfied, enable a prediction filter that computes a coefficient estimation parameter for the motion vector based on a direction of the motion vector and the speed of the motion vector;
predicts a future touch input using the coefficient estimation parameter; and
controls the display to indicate a display position corresponding to the predicted future touch input; and
if the predetermined condition is not satisfied, disable the prediction filter.

2. The information processing apparatus of claim wherein the circuitry is configured to calculate the motion vector as a motion vector that originates at a first sampled touch position and terminates at a second sampled touch position.

3. The information processing apparatus of claim 1, wherein
the circuitry is configured to compute a value of the coefficient estimation parameter that is variable within the predetermined speed range.

4. The information processing apparatus of claim 1, wherein
the circuitry is configured to compute a value of the coefficient estimation parameter that is fixed within the predetermined speed range.

5. The information processing apparatus of claim 1, wherein
the circuitry is configured to increase the value of the coefficient estimation parameter when the speed of the motion vector is within the predetermined speed range, and decrease the value of the coefficient estimation parameter when the speed of the motion vector is outside the predetermined speed range.

6. The information processing apparatus of claim 1, wherein
the first area is a central area;
the second area is a peripheral area that surrounds the central area; and
the circuitry determines that the predetermined condition is satisfied when the motion vector lies entirely in the central area of the display.

7. The information processing apparatus of claim 1, wherein
the first area is a central area;
the second area is a peripheral area that surrounds the central area; and
the circuitry determines that the predetermined condition is satisfied when the motion vector begins in the peripheral area and ends in the central area of the display.

8. The information processing apparatus of claim 1, wherein
the first area is a central area;
the second area is a peripheral area that surrounds the central area; and
the circuitry determines that the predetermined condition is not satisfied when the motion vector begins in the central area and ends in the peripheral area.

9. The information processing apparatus of claim 1, wherein
the first area is a central area;
the second area is a peripheral that surrounds the central area; and
the circuitry is configured t decrease the value of the coefficient estimation parameter when the motion vector approaches the peripheral area of the display, and increase the value of the coefficient estimation parameter when the motion vector is in the central area of the display.

10. The information processing apparatus of claim 9, wherein
the circuitry determines that the predetermined condition is satisfied when the speed of the motion vector is in the predetermined speed range and the motion vector terminates in the central area of the display.

11. The information processing apparatus claim 6, wherein
the circuitry is configured to determine a moving direction of the motion vector and to increase the value of the coefficient estimation parameter when the motion vector is directed from the peripheral area to the central of the display, and decrease the value of the coefficient estimation parameter when the motion vector is directed from the central area to the peripheral area of the display.

12. An information processing method performed by an information processing apparatus having a circuitry, a display, and a touch sensor, the method comprising:
detecting a touch input by the touch sensor;
displaying a display position on the display corresponding to the touch input;
dividing the display into a first area and a second area;
receiving coordinate positions corresponding to the touch input;
sampling the coordinate positions corresponding to the touch input;
calculating a motion vector corresponding to the touch input based on the sampling;
determining whether a predetermined condition is satisfied, the predetermined condition comprising a condition that the motion vector lies entirely in or terminates in the first area and a condition that a speed of the motion vector is in a predetermined speed range;
if the predetermined condition is satisfied, enabling a prediction filter that computes by the circuitry a coefficient estimation parameter for the motion vector based on a direction of the motion vector and the speed of the motion vector;
predicts a future touch input using the coefficient estimation parameter; and
controls the display to indicate a display position corresponding to the predicted future touch input; and
if the predetermined condition is not satisfied, disabling the prediction filter.

13. A non-transitory computer-readable medium including computer program instructions, which when executed by an information processing apparatus having a circuitry, a display, and a touch sensor, cause the information processing apparatus to perform a process, the process comprising:
detecting a touch input by the touch sensor;
displaying a display position on the display corresponding to the touch input;
dividing the display into a first area and a second area;
receiving coordinate positions corresponding to the touch input;
sampling the coordinate positions corresponding to the touch input;
calculating a motion vector corresponding to the touch input based on the sampling;
determining by the circuit whether a predetermined condition is satisfied, the predetermined condition comprising a condition that the motion vector lies entirely in or terminates in the first area and a condition that a speed of the motion vector is in a predetermined speed range; and
if the predetermined condition is satisfied, enabling a prediction filter that computes by the circuitry a coefficient estimation parameter for the motion vector based on a direction of the motion vector and the speed of the motion vector;
predicts by the circuitry a future touch input using the coefficient estimation parameter; and
controls the display to indicate a display position corresponding to the predicted future touch input; and
if the predetermined condition is not satisfied, disabling the prediction filter.

* * * * *